H. O. SMITH.
FASTENER.
APPLICATION FILED NOV. 15, 1919.

1,341,600.

Patented May 25, 1920.
2 SHEETS—SHEET 1.

Inventor
H.O.Smith

By [signature] Atty

H. O. SMITH.
FASTENER.
APPLICATION FILED NOV. 15, 1919.

1,341,600.

Patented May 25, 1920.
2 SHEETS—SHEET 2.

Inventor
H. O. Smith
By [signature] Atty

UNITED STATES PATENT OFFICE.

HARRY O. SMITH, OF KANSAS CITY, MISSOURI.

FASTENER.

1,341,600.  Specification of Letters Patent.  Patented May 25, 1920.

Application filed November 15, 1919. Serial No. 338,241.

*To all whom it may concern:*

Be it known that I, HARRY O. SMITH, a citizen of the United States, residing at Kansas City, in the county of Jackson and State of Missouri, have invented certain new and useful Improvements in Fasteners; and I do hereby declare the following to be a full, clear, and exact description of the invention, such as will enable others skilled in the art to which it appertains to make and use the same.

This invention relates to new and useful improvements in fasteners of the character illustrated, described, and claimed in my United States Letters Patent #1,273,100 and has for one of its objects the provision of a spring in the female member for receiving and gripping the male member to firmly hold the same in the female member.

Another object of this invention is the provision of means for securing the spring in the female member which will prevent displacement of the spring and will allow free movement of the spring when the male member is being inserted and withdrawn from the female member.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description, and accompanying drawings, in which—

Figure 1:
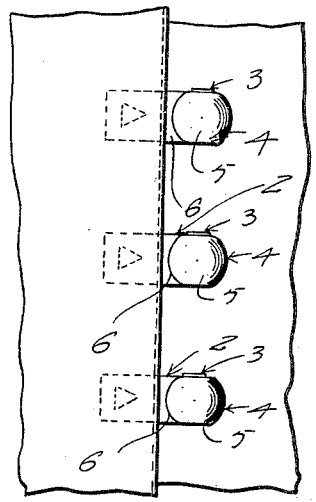

Figure 1 is a fragmentary portion of the upper of a shoe, having my improved fastener secured thereto and said fastener being in a closed position.

Figure 2:
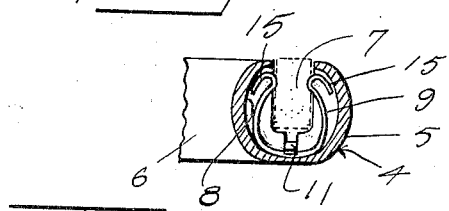
Figure 3:
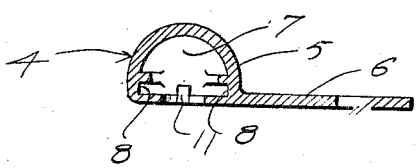
Figure 4:
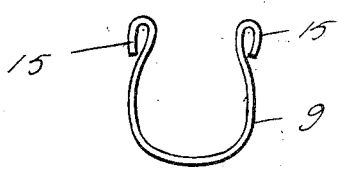
Figure 5:
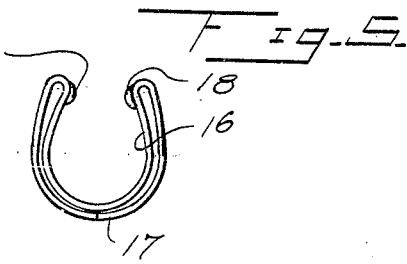
Figure 6:
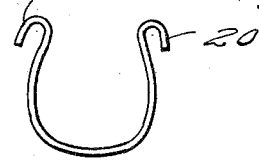
Figure 7:
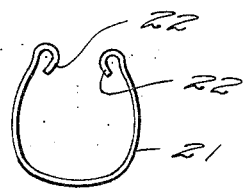
Figure 8:
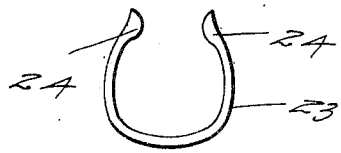
Figure 9:
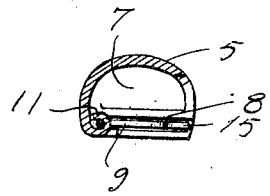
Figure 10:
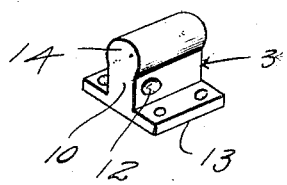
Figure 11:
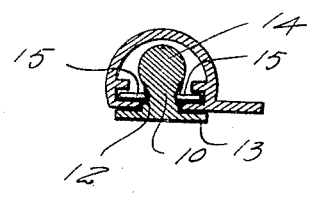
Figure 12:
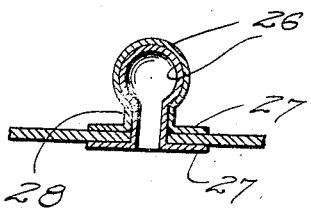
Figure 13:
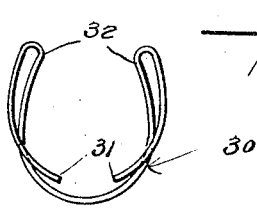

Fig. 2 is a sectional view of the female member illustrating the spring confined therein, Fig. 3 is a sectional view of the female member showing the groove for receiving the spring, Fig. 4 is a plan view of one form of the spring, Fig. 5 is a similar view illustrating a modified form of the spring, Fig. 6 is a similar view of another modified form of spring having its ends bent outwardly, Fig. 7 is a similar view of a modified form of spring illustrating the ends disposed inwardly, Fig. 8 is a plan view of a modified form of spring of considerable thickness and having its ends enlarged, Fig. 9 is a detail sectional view illustrating the means of securing the spring in the groove, Fig. 10 is a perspective view of an elongated male member, Fig. 11 is a sectional view of the female member illustrating the spring therein gripping the male member, Fig. 12 is a vertical sectional view of a modified form of male member, Fig. 13 is a plan view illustrating another modified form of spring.

Referring in detail to the drawings, the numeral 1 indicates the portion of an upper of a shoe having a fastener 2 secured thereto and which fastener consists of male and female members 3 and 4. The female member 4 consists of a head 5 having a lateral attaching flange 6. The head 5 is of substantially semi-spherical shape and is provided with a recess 7 that opens outwardly through the bottom and side walls thereof so as to receive the shank and head portions of the male member 3. The wall of the recess 7 of the head 5 is provided with a groove 8 adapted to receive a spring 9. The spring 9 is seated within the groove 8 and so positioned as to engage the shank 10 of the male member 3. A fastening element 11 is formed on the inner wall of the head of the female member and is bent over the spring at a point intermediate its ends to retain said spring within the groove 8. When the male member is inserted within the female member, the spring grips the male member and firmly holds the same within the female member. The ends of the spring fit within recesses or sockets 12 formed in the sides of the stem 10 of the male member.

By referring to Fig. 10 it will be noted that the male member consists of a base 13 having formed thereon the shank 10 and head 14. The shank and head are of elongated formation as clearly shown in the drawings. The spring 9 is constructed from resilient material which is bent into substantially U-shape or horseshoe shape having the ends thereof curved outwardly and inwardly to form resilient portions 15 that dispose the ends of the spring outwardly of the groove to engage the male member but will permit the ends of the spring to move inwardly of the groove 8 when inserting or withdrawing the male member from the female member. It is to be noted that the groove 8 will relieve the spring 9 of any undue strain when inserting or withdrawing the male member as over a certain amount of movement of the spring it becomes confined within the groove and the male member then cannot exert further pressure thereon.

Referring to my modified form of spring as shown in Fig. 5, it consists of a piece of resilient material that is bent first into substantially U-shape or horseshoe formation, and has its ends bent outwardly and rearwardly upon itself and having its ends abutting each other. The ends of the spring 16 form tension means 17 that rest within the groove 8 and against the rear wall thereof permitting the ends of the spring portion to project beyond the groove for engagement with the male member. Enlargements 18 are formed on the ends of the spring portion 16 for engagement with the male member and the sockets thereof.

In Fig. 6, I have shown a spring substantially of the same construction and formation as the spring shown in Fig. 4 in that the spring is constructed from a single length of resilient material and is bent into substantially U-shape or horseshoe shape having its ends 20 curved outwardly and rearwardly a short distance to form tension portions.

Referring to my modified form of spring 21 as shown in Fig. 7, it is constructed from a single length of resilient material bent into substantially U-shape or horseshoe shape form having its ends 22 curved inwardly and rearwardly, to form gripping portions adapted to engage the shank of the male member.

Referring to my modified form of spring 23 as shown in Fig. 8, it consists of a single length of resilient material of considerable thickness bent into substantially U-shape or horseshoe formation having its ends enlarged as illustrated at 24 and slightly curved outwardly, and which enlargements are adapted to engage and grip the shank of the male member.

Referring to my modified form of male member shown in Fig. 12 it consists of a pair of spherical portions 26 one arranged within the other and having formed upon their edges laterally extending flanges 27. The flanges 27 are adapted to have secured between the same the goods or leather of the shoe. Between the flanges and the spherical portions 26 a comparatively short neck 28 is provided which is adapted to be gripped by the ends of the spring heretofore described when inserted within the female member.

Referring to Fig. 13 I have shown another modified form of spring 30 which consists of a single length of material first bent into U-shape and having its ends curved outwardly and rearwardly and the extreme ends 31 extended inwardly over the U-shaped portion to be engaged by the male member. The male member engaging the ends 31 will cause the ends 32 to tightly grip the shank 7 of said male member.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. A fastener including a hollow female member having a groove in its inner wall and a male member, and a spring formed from a single length of resilient material bent into substantially horseshoe shape and located in the groove of the female member and adapted to grip the male member, and means securing the spring in the groove.

2. A fastener including a hollow female member having a groove in its inner wall and a male member, a spring formed from a single length of resilient material bent into substantially horseshoe shape and located in the groove, a fastening element formed on the inner wall of the female member and bent to overlie and secure the spring in the groove, said spring adapted to grip the male member with its ends.

3. A fastener including a hollow female member and a male member having a shank with oppositely disposed recesses, and a head, a spring formed from a single length of resilient material bent into substantially horseshoe shape and secured in the female member, the ends of said spring adapted to fit into the recesses of the shank of the male member when the head thereof is inserted within the female member.

4. A fastener including a hollow female member and a male member, a spring formed from a single length of resilient material bent into substantially horseshoe shape and secured into the female member and having its ends curved outwardly and rearwardly and terminating adjacent each other, said spring adapted to grip the male member when inserted in the female member.

5. A spring for separable fasteners constructed from a single length of resilient material bent into substantially U-shape and having its ends curved outwardly, rearwardly and inwardly over the U-shape portion to be engaged by a male member which causes the ends of the U-shaped portion to grip the male member.

In testimony whereof I affix my signature in presence of two witnesses.

HARRY O. SMITH.

Witnesses:
J. HERBERT SMITH,
AMOS TOWNSEND.